United States Patent [19]

Okitsu et al.

[11] Patent Number: 4,536,563

[45] Date of Patent: Aug. 20, 1985

[54] PROCESS FOR MANUFACTURING POLYETHERESTERAMIDE

[75] Inventors: Kiyoshi Okitsu; Hiroyouki Go, both of Otake, Japan

[73] Assignee: Daicel Chemical Industries, Ltd., Sakai, Japan

[21] Appl. No.: 668,240

[22] Filed: Nov. 5, 1984

[30] Foreign Application Priority Data

Nov. 18, 1983 [JP] Japan .............................. 58-217610
Feb. 22, 1984 [JP] Japan .............................. 59-32228

[51] Int. Cl.³ ..................... C08G 63/04; C08G 63/34
[52] U.S. Cl. ................................. 528/279; 525/425; 528/288; 528/292
[58] Field of Search ............... 528/279, 288, 292; 525/425

[56] References Cited

U.S. PATENT DOCUMENTS

| | | | |
|---|---|---|---|
| 4,251,652 | 2/1981 | Tanaka et al. | 528/279 |
| 4,345,064 | 8/1982 | Mumcu | 528/288 |
| 4,349,661 | 9/1982 | Mumcu | 528/288 |
| 4,376,194 | 3/1983 | Tanaka et al. | 528/288 |
| 4,376,856 | 3/1983 | Tanaka et al. | 528/292 |
| 4,380,622 | 4/1983 | Chiba et al. | 528/288 |

*Primary Examiner*—Lucille M. Phynes
*Attorney, Agent, or Firm*—Flynn, Thiel, Boutell & Tanis

[57] ABSTRACT

A process for manufacturing a colorless polyetheresteramide, which comprises the step of reacting (A) a polyamide-forming compound selected from aminocarboxylic acids and lactams each having at least 10 carbon atoms, (B) a dicarboxylic acid having from 4 to 20 carbon atoms and (D) a polyoxyalkylene glycol having an average molecular weight of from 300 to 6,000, in the molten state, in the presence of 0.0001 to 0.00999 percent by weight, based on the total weight of the above mentioned reactants, of a tetraalkyl titanate having a straight or branched alkyl having 1 to 24 carbon atoms, at a pressure of at the highest 5 mmHg at a temperature of 200° to 300° C.

3 Claims, No Drawings 4,536,563

PROCESS FOR MANUFACTURING POLYETHERESTERAMIDE

BACKGROUND OF THE INVENTION

1. Field of the Invention

This invention concerns a process for manufacturing a polyetheresteramide and, more specifically, it relates to a process for producing a colorless polyetheresteramide with a high degree of polymerization using one or more polyamide-forming compound selected from the group consisting of aminocarboxylic acids or lactams, a dicarboxylic acid and a polyoxyalkylene glycol as starting materials.

2. Description of the Prior Art

Polyetheresteramides contain polyamide repeating units, polyether repeating units and ester bonds in the main polymer chain, and they have attracted attention in recent years as novel materials in the field of elastomers since they have excellent impact shock property and rubber-like elasticity comparable with those of polyester elastomer or polyurethane elastomer.

Since the polyetheresteramides are particularly excellent in view of their light weight, low temperature performance, chemical resistance, oil resistance, sound proofness and molding property, much demand is expected for them in the fields such as hoses, tubes and wiper rubbers for automobiles and shoe soles for sport shoes, as well as those fields where severe quality is required in sanitary point of view such as food stuffs and medical equipments.

However, the polyetheresteramides involve a problem that they are colored due to a certain kind of decomposing reaction upon polymerization and, although several improvements have been proposed so far, none of them was satisfactory as the process for industrially producing colorless polyetheresteramides with high degree of polymerization.

In view of the above, the present inventors have made an earnest study for the production of colorless polyetheresteramides with high degree of polymerization which are excellent in their light weight, low temperature performance, chemical resistance, oil resistance, sound proofness and moldability and, as the result, have accomplished this invention on the basis of the discovery that a colorless polyetheresteramide can be obtained by using one or more polyamide-forming compound selected from the group consisting of aminocarboxylic acids and lactams, a dicarboxylic acid and a polyoxyalkylene glycol as the starting materials and subjecting them to polycondensating reaction in the presence of 0.0001 to 0.00999% by weight, based on the total weight of the above-mentioned reaction mixture, of a catalyst containing a tetraalkyl titanate under high vacuum (lower than 5 mmHg) at a temperature between 200°-300° C.

SUMMARY OF THE INVENTION

Specifically this invention provides a process for manufacturing a polyetheresteramide, which comprises the step of reacting (A) a polyamide-forming compound selected from aminocarboxylic acids and lactams each having at least 10 carbon atoms, (B) a dicarboxylic acid having from 4 to 20 carbon atoms and (D) a polyoxyalkylene glycol having an average molecular weight of from 300 to 6,000, in the molten state, in the presence of 0.0001 to 0.00999 percent by weight, based on the total weight of the above mentioned reactants, of a tetraalkyl titanate having a straight or branched alkyl having 1 to 24 carbon atoms, at a pressure of at the highest 5 mmHg at a temperature of 200° to 300° C.

DESCRIPTION OF THE INVENTION

The reaction between the reactants (A), (B) and (D) according to the invention is carried out in one stage or two stages. The two stage reaction is preferably effected by first reacting (A) with (B) to produce (C) a dicarboxylic polyamide having an average molecular weight of 300 to 6,000 and carboxylic groups at both ends of the polymer chain and then reacting (C) with (D) in the molten state in the presence of 0.0001 to 0.00999 percent by weight of the above mentioned catalyst at the above mentioned pressure at the above mentioned temperature.

The one stage reaction is preferred to use as the polyamide-forming compound an aminocarboxylic acid having at least 10 carbon atoms.

We will illustrate the invention below first in respect with the two stage reaction.

The polyetheresteramide according to this invention can be obtained by subjecting (C) a dicarboxylic acid polyamide having COOH groups at both ends of the polymer chain and (D) a polyoxyalkylene glycol having a hydroxyl group at the end of the polymer chain to the polycondensating reaction in the presence of a catalyst containing a tetraalkyl titanate represented by the general formula $Ti(OR)_4$ (where R represents a straight or branched aliphatic hydrocarbon group having 1–24 carbon atoms). The tetraalkyl titanate catalyst usable herein includes tetramethyl titanate, tetraisopropyl titanate, tetrabutyl titanate, tetra-2-ethyl-hexyl titanate, tetradodecyl titanate, tetrahexadodecyl titanate and the like, the tetrabutyl titanate being particularly perffered. The catalyst is preferably used in an amount from 0.0001 to 0.00999% by weight based on the reaction mixture comprising (C) the dicarboxylic polyamide and (D) the polyoxyalkylene glycol and, it is used particularly preferably in an amount from 0.0005 to 0.005% by weight in view of the reactivity, and coloring and water proofness of the polyetheresteramide. Further, alkali metal or alkaline earth metal alcoholate can also be used together in the catalyst so long as it does not impair the advantageous feature thereof.

The dicarboxylic polyamide (C) having carboxylic groups at the both ends of the polymer chain can be obtained from (A) the polyamide-forming compound and (B) the dicarboxylic acid in the known method. The method includes polycondensation of lactam carried out or polycondensation of aminocarboxylic acid under the presence of the dicarboxylic acid, in which the dicarboxylic acid is bonded during polycondensating reaction to form a high molecular polyamide polymer chain. Particularly carboxylic groups can be added to the terminal ends of the polymer chain to obtain $\alpha, \omega$-dicarboxylic polyamide. The average molecular weight of the polyamide can be adjusted by properly selecting the addition amount of the dicarboxylic acid. The control for the average molecular weight is determined according to the known method of calculation employed at present in the field of the polycondensating reaction based on the blending amount of (A) the polyamide-forming compound and (B) the dicarboxylic acid. The average molecular weight of (C) the dicarboxylic polyamide is from 300 to 6,000 and, preferably, from 500 to 3,000. The aminocarboxylic acid or lactam having 10 or more carbon atoms as (A) the polyamide-forming compound in this invention can include 10-amino decanoic acid, 11-aminoundecanoic acid, 12-aminododecanoic acid, lauryl lactam and the like. 11-aminoundecanoic acid, 12-aminododecanoic acid and lauryl lactam are particularly preferred and they may be used in combination. Furthermore, caprolactam can also be used together within a range as not imparing the feature of this invention.

The dicarboxylic acid (B) having 4-20 carbon atoms usable in this invention can include aromatic dicarboxylic acid such as terephthalic acid, isophthalic acid, phthalic acid, naphthalene-2,6-dicarboxylic acid, naphthalene-2,7-dicarboxylic acid, diphenyl-4,4'-dicarboxylic acid and diphenoxyethane dicarboxylic acid; cycloaliphatic dicarboxylic acid such as 1,4-cyclohexane dicarboxylic acid, 1,2-cyclohexane dicarboxylic acid, dicyclohexyl-4,4'-dicarboxylic acid; and aliphatic dicarboxylic acid such as succinic acid, oxalic acid, adipic acid, sebacic acid and dodecanoic diacid. Terephthalic acid, isophthalic acid, 1,4-cyclohexane dicarboxylic acid, adipic acid, sebacic acid and dodecanoic diacid are used particularly preferably.

The polyoxyalkylene glycol (D) having the number average molecular weight of from 200 to 6,000 usable in this invention can include polyethylene glycol, polypropylene glycol, polytetramethylene glycol, block or random copolymer of ethylene oxide and propylene oxide, block or random copolymer of ethylene oxide and tetrahydrofuran, polytetramethylene glycol being used preferably in view of the heat resistance, water proofness and mechanical strength. The preferred molecular weight region for the polytetramethylene glycol lies within the average molecular weight of from 500 to 2,000 in view of the phase separation upon polymerization, low temperature property and mechanical property.

The weight ratio of (D) the polyoxyalkylene glycol based on the weight of the total ingredients is from 5 to 90% and, preferably, from 10 to 80%. If it is less than 5%, no significant improvement can be obtained for providing the polyetheresteramide with the impact shock and cold resistance. While on the other hand, if it exceeds 90%, the length of the hard amide block becomes to short to result in a polymer with poor physical properties.

The polycondensating reaction between (C) the dicarboxylic polyamide and (D) the polyoxyalkylene glycol for producing the polyetheresteramide is carried out under the presence of the catalyst while stirring at a high vacuum of less than 5 mmHg, preferably, less than 1 mmHg at a reaction temperature between 200°-300° C. and, preferably, 200°-280° C.

Further it is essential in the production of the colorless polyetheresteramide with high degree of polymerization having excellent physical properties that the polycondensating reaction is taken place while combining (C) the dicarboxylic polyamide and (D) the polyoxyalkylene glycol such that the carboxylic groups of (C) the dicarboxylic polyamide and the hydroxyl groups of (D) the polyoxyalkylene glycol lie within the range:

$$0.95 \leq (COOH)/(OH) \leq 1.05$$

The manufacturing process for the polyetheresteramide according to this invention comprises a process of synthesizing (C) the dicarboxylic polyamide at the first stage and subjecting (C) the dicarboxylic polyamide and (D) the polyoxyalkylene glycol to the polycondensating reaction under the presence of the catalyst at the second stage. The process according to this invention shows less thermal hysteresis of the polyoxyalkylene glycol as compared with the process of manufacturing the polyetheresteramide in one stage of polycondensating reaction from (A) the polyamide-forming compound, (B) the dicarboxylic acid and (D) the polyoxyalkylene glycol. Accordingly, in the manufacturing process of this invention, the thermal degradation of the ether bonds in the polyoxyalkylene glycol is reduced and, as the result, colorless polyetheresteramide of high degree of polymerization having excellent physical properties can be obtained.

It is added that the invention process is carried out also in one stage as mentioned before. The one stage reaction is effected by introducing the reactants (A), (B) and (D) at the same time in a reactor and conducting the polycondensating reaction under the same conditions as in the second stage of the above illustrated two stage reaction. The starting materials, (A), (B) and (D), which are used in the two stage reaction, may be used also here. The reaction provides the above mentioned improvement of the obtained polymer especially when it is effected under the condition of:

$$0.95 \leq (COOH)/(NH_2)+(OH) \leq 1.05$$

Stabilizers such as anti-oxidant, heat stabilizer and UV absorber can be incorporated in the polyetheresteramide according to this invention during polymerization or after polymerization and before molding. The anti-oxidant and heat stabilizer usable in this invention can include various hindered phenols such as 4,4'-bis(2,6-di-t-butylphenol), 1,3,5-trimethyl-2,4,6-tris(3,5-di-t-butyl-4-hydroxybenzyl)benzene, tetrakis(methylene-3-(3,5-di-t-butyl-4-hydroxyphenyl)propionate)methane and N,N'-hexamethylene-bis(3,5-di-t-butyl-4-hydroxyhydro cinnamic amide); aromatic amines such as N,N'-bis($\beta$-naphthyl)-p-phenylenediamine, 4,4'-bis(4-$\alpha,\alpha$-dimethylbenzyl)diphenylamine; sulfur compounds such as dilauryl thiodipropionate; phosphor compounds; alkaline earth metal oxides; nickel salts such as Schiff base, as well as cuprous iodide and/or potassium iodide. The UV absorbers can include substituted benzophenones, benzotriazoles and piperidine compounds such as bis(2,2,6,6-tetramethyl-4-piperidine)sebacate and 4-benzoyloxy-2,2,6,6-tetramethylpiperidine.

Further, the polyetheresteramide according to this invention can also be incorporated optionally with hydrolysis resistant improver, coloring agent (pigment and dye), antistatic agent, electroconductive agent, flame retardant, reinforcing agent, filler, lubricant, nucleating agent, releasing agent, plasticizer, adhesive aid, tackifier and the like.

This invention will now be described referring to examples, which no way limit the invention.

In the Examples, parts mean parts by weight.

EXAMPLE 1

To a 2 liter volume four-necked separable flask equipped with a stirrer, a $N_2$ introduction pipe, a thermometer and a water drain pipe, were charged 230 parts of dodecanoic diacid and 838.5 parts of 12-aminododecanoic acid. After itroducing $N_2$ gas and elevating temperature to 200° C. for about 6 hours, they were reacted at 200°-220° C. for about 4 hours to produce 980 parts of a dicarboxylic polyamide having an acid value of 114.0.

Then, 126.4 parts of the dicarboxylic polyamide produced as described above, 251.3 parts of polytetramethylene glycol having an OH value of 57.2, 0.0038 parts of tetrabutyl titanate and 0.76 parts of Irganox 1010 (antioxidant, manufactured by Ciba Geigy) were charged into a one liter volume four necked separable flask equipped with a stirrer, a $N_2$ introduction pipe, a thermometer and a water drain pipe, and they were heated to 250° C. while introducing $N_2$ gas. The mixture was stirred from the instance the ingredients were melted. Thereafter the reaction was continued at 250° C. under the vacuum of 0.7 mmHg for 7 hours to obtain 370 parts of a substantially colorless polyetheresteramide.

The polyetheresteramide thus obtained had relative viscosity $\eta rel$ of 1.95 (in 0.5% m-cresol solution at 25° C.) and melting point of 153° C. (according to differential thermal analysis). The polyetheresteramide thus obtained was further subjected to press molding (press condition: preheated at 160° C. for 20 min and pressurized for 5 min) and the physical properties were measured. The results are as shown in Table -1.

EXAMPLE 2

In the same manner as in Example 1, 1361 parts of a dicarboxylic polyamide having an acid value of 173.1 were obtained from 464.1 parts of dodecanoic diacid and 969 parts of 12-aminododecanoic acid.

Then, 96.8 parts of the dicxarboxylic polyamide produced as described above, 291.4 parts of polytetramethylene glycol having OH a value of 57.2, 0.0039 parts of tatrabutyl titanate and 0.78 parts of Irganox 1010 were reacted in the same manner as in Example 1 to produce 380 parts of a substantially colorless polyetheresteramide.

The polyetheresteramide thus obtained had a relative viscosity $\eta rel$ of 1.95 and melting point of 154° C. The polyetheresteramide thus obtained was further subjected to the press molding and the physical properties were measured in the same manner as in Example 1. The results are as shown in Table-1.

TABLE 1

Result for the estimation of the physical property

| | Commercial good | Example 1 | Example 2 |
|---|---|---|---|
| appearance | brown | white | white |
| melting point (°C.) | 150 | 153 | 154 |
| hardness Shore D*1 | 40D | 30D | 25D |
| 100% modulus (kgf/cm$^2$)*2 | 106.5 | 61.4 | 43.9 |
| 300% modulus (kgf/cm$^2$)*2 | 121.5 | 86.3 | 62.5 |
| break strength (kgf/cm$^2$)*2 | 187.3 | 244.7 | 216.7 |
| elongation at break (%)*2 | 624 | 897 | 1020.5 |

(Note)
*1 Hardness: measured according to ASTM-D-2240
*2 Tensile test: measured according to JIS K 7113

EXAMPLE 3

To a 2 liter volume four-necked separable flask equipped with a stirrer, a $N_2$ introduction pipe, a thermometer, a water drain pipe, were charged 69.6 parts of 12-aminododecanoic acid, 33.3 parts of dodecanoic diacid, 298.6 parts of polytetramethylene glycol having an OH value of 57.2, 0.004 parts of tetrabutyl titanate and 0.8 parts of Irganox 1010 (manufactured by Ciba Geigy) as the antioxidant. After introducing $N_2$ gas and elevating the temperature to 220° C., they were reacted for about 3 hours at 220° C.

Then, the temperature was elevated to 250° C., and the introduction of the $N_2$ gas was interrupted when the temperature arrived at 250° C. and the pressure was started to reduce. Thereafter, the reaction was continued for about 7 hours at 250° C. under 0.7 mmHg to obtain 380 parts of a substantially colorless polyetheresteramide.

The polyetheresteramide thus obtained had relative viscosity $\eta rel$ of 1.95 (in 0.5% m-cresol solution at 25° C.) and melting point of 153° C. (according to differential thermal analysis). Thus obtained polyetheresteramide was further subjected to press molding (press conditions: preheated at 160° C. for 10 min and pressurized for 5 min) and the physical properties were measured. The results are as shown in Table -2.

COMPARATIVE EXAMPLE 1

To the same apparatus as in Example 3, were charged 73.5 parts of 12-aminododenoic acid, 35.2 parts of dodecanoic diacid, 315.5 parts of polytetramethylene glycol having an OH value of 57.2, 0.42 parts of tetrabutyl titanate and 0.84 parts of Irganox 1010 (manufactured by Ciba Geigy) as the antioxidant, and they were reacted in the same manner as in Example 3 to produce 400 parts of a pale yellow polyetheresteramide.

The polyetheresteramide thus obtained had relative viscosity $\eta rel$ of 1.95 and melting point of 153° C. Then, the polyetheresteramide thus obtained was subjected to press molding (under the same press conditions as those in Example 3) and the physical properties were measured. The results are as shown in Table-2.

TABLE 2

Result for the estimation of the physical property

| | | Comparative Example 1 | Example 3 |
|---|---|---|---|
| Primary Physical property | appearance | pale yellow | white |
| | melting point (°C.) | 153 | 153 |
| | hardness Shore D*1 | 22D | 22D |
| | 100% modulus (kgf/cm$^2$)*2 | 37 | 39 |
| | 300% modulus (kgf/cm$^2$)*2 | 57 | 60 |
| | break strength (kgf/cm$^2$)*2 | 194 | 204.0 |
| | elongation at break (%)*2 | more than 950 | more than 1100 |

(Note)
*1 Hardness: measured according to ASTM-D-2240
*2 Tensile test: measured according to JIS K 7113

The embodiments of the invention in which an exclusive property or privilege is claimed are defined as follows:

1. A process for manufacturing a polyetheresteramide, which comprises the step of reacting (A) a polyamide-forming compound selected from aminocarboxylic acids and lactams each having at least 10 carbon atoms, (B) a dicarboxylic acid having from 4 to 20 carbon atoms and (D) a polyoxyalkylene glycol having an average molecular weight of from 300 to 6,000, in the molten state, in the presence of 0.0001 to 0.00999 percent by weight, based on the total weight of the above mentioned reactants, of a tetraalkyl titanate having a straight or branched alkyl having 1 to 24 carbon atoms, at a pressure of at the highest 5 mm Hg at a temperature of 200° to 300° C.

2. A process as claimed in claim 1, in which the reaction is conducted by first reacting (A) with (B) to produce (C) a dicarboxylic polyamide having an average molecular weight of 300 to 6,000 and a carboxylic group at the end of the polymer chain and then reacting (C) with (D) in the molten state in the presence of 0.0001 to 0.00999 percent by weight of said catalyst at said pressure at said temperature.

3. A process as claimed in claim 1, in which said polyamide-forming compound is an aminocarboxylic acid having at least 10 carbon atoms.

* * * * *